(12) United States Patent
Motoki et al.

(10) Patent No.: US 12,689,405 B2
(45) Date of Patent: Jul. 21, 2026

(54) RADIO FREQUENCY CIRCUIT AND COMMUNICATION DEVICE

(71) Applicant: Murata Manufacturing Co., Ltd., Kyoto (JP)

(72) Inventors: Kanta Motoki, Kyoto (JP); Hiroyuki Satake, Kyoto (JP); Hiromu Horaguchi, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 281 days.

(21) Appl. No.: 18/498,481

(22) Filed: Oct. 31, 2023

(65) Prior Publication Data

US 2024/0063842 A1 Feb. 22, 2024

Related U.S. Application Data

(63) Continuation of application No. PCT/JP2022/022850, filed on Jun. 6, 2022.

(30) Foreign Application Priority Data

Jun. 16, 2021 (JP) ................................. 2021-100016

(51) Int. Cl.
H04B 1/525 (2015.01)
(52) U.S. Cl.
CPC .................................... H04B 1/525 (2013.01)
(58) Field of Classification Search
None
See application file for complete search history.

(56) References Cited

U.S. PATENT DOCUMENTS

| | | | | |
|---|---|---|---|---|
| 12,212,356 B2 * | 1/2025 | Pehlke | ...................... | H04B 1/04 |
| 2013/0147678 A1 * | 6/2013 | Taniguchi | .............. | H03H 9/706 |
| | | | | 343/858 |
| 2014/0376417 A1 * | 12/2014 | Khlat | ...................... | H04L 5/001 |
| | | | | 370/277 |

(Continued)

FOREIGN PATENT DOCUMENTS

| | | |
|---|---|---|
| CN | 105656610 A | 6/2016 |
| JP | 2021-002754 A | 1/2021 |

(Continued)

OTHER PUBLICATIONS

International Search Report for PCT/JP2022/022850 dated Jul. 5, 2022.

*Primary Examiner* — Wen W Huang
(74) *Attorney, Agent, or Firm* — McDonald Hopkins LLC

(57) ABSTRACT

A radio frequency circuit is capable of simultaneously transmitting a signal of a band A and a signal of a band B, a second downlink operation band of the band B overlapping $(2 \times f2-f1)$, where f1 is a frequency of a first uplink operation band of the band A, and f2 is a frequency of a second uplink operation band of the band B, the radio frequency circuit including antenna connection terminals connected to different antennas, a filter that is connected to the antenna connection terminal and has a pass band that includes the first uplink operation band, a filter that is connected to the antenna connection terminal and has a pass band that includes the second uplink operation band, and a filter that is connected to the antenna connection terminal and has a pass band that includes a second downlink operation band.

12 Claims, 9 Drawing Sheets

(56)                References Cited

U.S. PATENT DOCUMENTS

| | | | | |
|---|---|---|---|---|
| 2015/0133067 A1* | 5/2015 | Chang | ................... | H04B 1/006 |
| | | | | 455/78 |
| 2016/0301436 A1* | 10/2016 | Zou | .................... | H04L 27/0008 |
| 2016/0323080 A1* | 11/2016 | Khlat | ....................... | H04B 1/38 |
| 2017/0048028 A1 | 2/2017 | Pehlke et al. | | |
| 2018/0309528 A1 | 10/2018 | King | | |
| 2019/0028136 A1 | 1/2019 | Zhang et al. | | |
| 2019/0074601 A1 | 3/2019 | Kim et al. | | |
| 2019/0115946 A1 | 4/2019 | Pehlke | | |
| 2019/0386687 A1 | 12/2019 | Lee et al. | | |
| 2020/0177212 A1 | 6/2020 | Cong et al. | | |
| 2020/0328764 A1 | 10/2020 | Ge et al. | | |
| 2020/0343930 A1* | 10/2020 | DiTommaso | ........... | H04B 1/44 |
| 2020/0366323 A1 | 11/2020 | Tsuda et al. | | |
| 2020/0403651 A1 | 12/2020 | Obiya et al. | | |
| 2021/0013910 A1* | 1/2021 | Ono | ........................ | H04B 1/04 |
| 2023/0155625 A1* | 5/2023 | Lim | ....................... | H04B 17/14 |
| | | | | 455/78 |

FOREIGN PATENT DOCUMENTS

| | | |
|---|---|---|
| JP | 2021-016049 A | 2/2021 |
| WO | 2019/151528 A1 | 8/2019 |

* cited by examiner

FIG. 1

B3:1710-1785MHz(Tx1) / 1805-1880MHz(Rx1)
B1:1920-1980MHz(Tx2) / <u>2110-2170MHz(Rx2)</u>

B66:1710-1780MHz(Tx1) / <u>2110-2200MHz(Rx2)</u>
B2:1850-1910MHz(Tx2) / 1930-1990MHz(Rx1)

FIG. 6

B20:832-862MHz(Tx1) / 791-821MHz(Rx1)
B8:880-915MHz(Tx2) / 925-960MHz(Rx2)

FIG. 8

RADIO FREQUENCY CIRCUIT AND COMMUNICATION DEVICE

CROSS REFERENCE TO RELATED APPLICATION

This is a continuation of International Application No. PCT/JP2022/022850 filed on Jun. 6, 2022 which claims priority from Japanese Patent Application No. 2021-100016 filed on Jun. 16, 2021. The contents of these applications are incorporated herein by reference in their entireties.

BACKGROUND OF THE DISCLOSURE

Field of the Disclosure

The present disclosure relates to radio frequency circuits and communication devices.

Description of the Related Art

Patent Document 1 discloses a radio frequency front-end module including a first multiplexer, a second multiplexer, and a first switch circuit arranged between primary and secondary antennas and the first and second multiplexers. The first switch circuit switches between connecting the primary antenna to the first multiplexer and connecting the primary antenna to the second multiplexer in a mutually exclusive manner and switches between connecting the secondary antenna to the first multiplexer and connecting the secondary antenna to the second multiplexer in a mutually exclusive manner. According to this, it becomes possible to have 2 uplinks and 2 downlinks while reducing the number of filters.

Patent Document 1: International Publication No. 2019/151528

BRIEF SUMMARY OF THE DISCLOSURE

However, in the radio frequency front-end module described in Patent Document 1, in some cases, the receiver sensitivity degrades when a frequency of the third-order intermodulation distortion caused by uplinks of a plurality of signals of two or more bands, which are different from each other, falls in one of reception bands of these two or more bands.

Accordingly, a possible benefit of the present disclosure is to provide a radio frequency circuit and a communication device, each of which can transmit a plurality of signals simultaneously and in each of which the degradation in receiver sensitivity is suppressed.

In order to achieve the foregoing possible benefit, a radio frequency circuit according to one aspect of the present disclosure is a radio frequency circuit capable of simultaneously transmitting a signal of a first band and a signal of a second band, the first band being made up of a first uplink operation band and a first downlink operation band, the second band being made up of a second uplink operation band and a second downlink operation band, the second downlink operation band overlapping ($2 \times f2 - f1$), where f1 is a frequency of the first uplink operation band and f2 is a frequency of the second uplink operation band, the radio frequency circuit including: a first antenna terminal, a second antenna terminal, and a third antenna terminal connected to antennas that differ from one another; a first filter connected to the first antenna terminal, the first filter having a pass band that includes the first uplink operation band; a second filter connected to the second antenna terminal, the second filter having a pass band that includes the second uplink operation band; a third filter connected to the third antenna terminal, the third filter having a pass band that includes the second downlink operation band; a first power amplifier connected to the first filter; and a second power amplifier connected to the second filter.

Further, a radio frequency circuit according to one aspect of the present disclosure is a radio frequency circuit capable of simultaneously transmitting a signal of a first band and a signal of a second band, the first band being made up of a first uplink operation band and a first downlink operation band, the second band being made up of a second uplink operation band and a second downlink operation band, the second downlink operation band overlapping ($2 \times f2 - f1$), the first downlink operation band not overlapping ($2 \times f1 - f2$), where f1 is a frequency of the first uplink operation band and f2 is a frequency of the second uplink operation band, the radio frequency circuit including: a first antenna terminal and a second antenna terminal connected to antennas that differ from one another; a first filter connected to the first antenna terminal, the first filter having a pass band that includes the first uplink operation band; a second filter connected to the second antenna terminal, the second filter having a pass band that includes the second uplink operation band; a third filter connected to the first antenna terminal, the third filter having a pass band that includes the second downlink operation band; a first power amplifier connected to the first filter; and a second power amplifier connected to the second filter, wherein the filter having a pass band that includes the second downlink operation band is not connected to the second antenna terminal.

According to the present disclosure, it becomes possible to provide a radio frequency circuit and a communication device, each of which can transmit a plurality of signals simultaneously and in each of which degradation in receiver sensitivity is suppressed.

BRIEF DESCRIPTION OF THE SEVERAL VIEWS OF THE DRAWINGS

FIG. 1 is a circuit configuration diagram of a radio frequency circuit and a communication device according to an embodiment.

FIG. 6 is a circuit configuration diagram of a radio frequency circuit and a communication device according to a modified example 2 of the embodiment.

FIG. 8 is a circuit configuration diagram of a radio frequency circuit and a communication device according to a modified example 3 of the embodiment.

DETAILED DESCRIPTION OF THE DISCLOSURE

Figure 2:
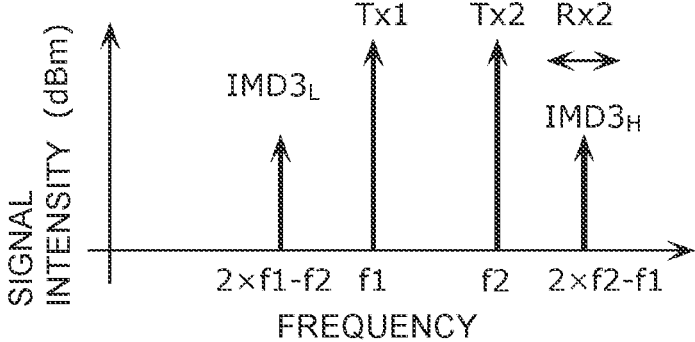
FIG. 2 is a diagram illustrating an example of generation of third-order intermodulation distortion in the radio frequency circuit according to the embodiment.

Hereinafter, an embodiment of the present disclosure will be described in detail with reference to the drawings. Note that the embodiment, which will be described below, illustrates a comprehensive or specific example. Numeric values, shapes, materials, constituent elements, arrangements of the constituent elements, connection modes of the constituent elements, and the like illustrated in the following embodiment are mere examples, and not intended to limit the present disclosure.

Note that each drawing is a schematic diagram in which emphasis, omission, or ratio adjustment is made if appropriate to illustrate the present disclosure and is not precisely drawn, and in some cases, the shape, spatial relationship, and ratio are different from the actual ones. In the drawings, the same reference characters are given to substantially the same constituent element, and in some cases an overlapping description is omitted or simplified.

In the present disclosure, the phrase "being connected" means to include not only the case of being directly connected via a connection terminal and/or a wiring conductor but also include the case of being electrically connected via another circuit element. Further, the phrase "being connected in between A and B" means to be connected to both A and B in a path connecting A and B.

Further, in the present disclosure, the term "transmission path" means a transmission line made up of a wiring line through which a radio frequency transmission signal propagates, an electrode directly connected to this wiring line, a terminal directly connected to this wiring line or this electrode, and the like. Further, the term "reception path" means a transmission line made up of a wiring line through which a radio frequency reception signal propagates, an electrode directly connected to this wiring line, a terminal directly connected to this wiring line or this electrode, and the like.

Embodiment

[1 Circuit Configurations of Radio Frequency Circuit 1 and Communication Device 5]

Figure 1:
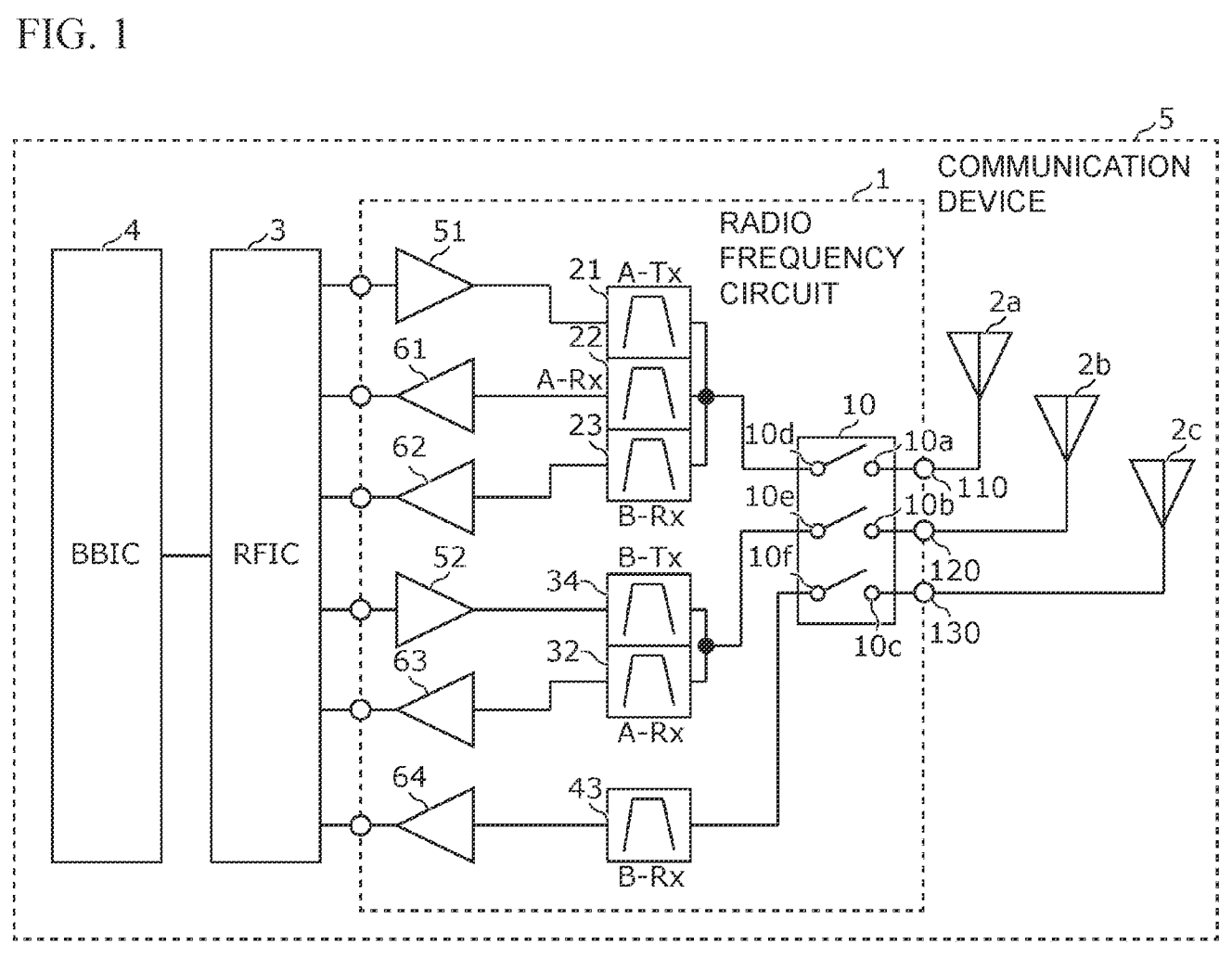

Circuit configurations of a radio frequency circuit 1 and a communication device 5 according to the present embodiment are described with reference to FIG. 1. FIG. 1 is a circuit configuration diagram of the radio frequency circuit 1 and the communication device 5 according to the embodiment.

[1.1 Circuit Configuration of Communication Device 5]

First, the circuit configuration of the communication device 5 is described. As illustrated in FIG. 1, the communication device 5 according to the present embodiment includes the radio frequency circuit 1, antennas 2a, 2b, and 2c, a RF signal processing circuit (RFIC) 3, and a base band signal processing circuit (BBIC) 4.

The radio frequency circuit 1 transmits radio frequency signals between the antennas 2a, 2b, and 2b and the RFIC 3. The circuit configuration of the radio frequency circuit 1 will be described later in detail.

The antenna 2a is connected to an antenna connection terminal 110 of the radio frequency circuit 1, transmits a radio frequency signal outputted from the radio frequency circuit 1, receives a radio frequency signal from outside, and outputs a received radio frequency signal to the radio frequency circuit 1. The antenna 2b is connected to an antenna connection terminal 120 of the radio frequency circuit 1, transmits a radio frequency signal outputted from the radio frequency circuit 1, receives a radio frequency signal from outside, and outputs a received radio frequency signal to the radio frequency circuit 1. The antenna 2c is connected to an antenna connection terminal 130 of the radio frequency circuit 1, transmits a radio frequency signal outputted from the radio frequency circuit 1, receives a radio frequency signal from outside, and outputs a received radio frequency signal to the radio frequency circuit 1.

The antenna 2a is, for example, a primary antenna, is an antenna that is preferentially used over the antennas 2b and 2c in terms of antenna performance and the like, and is an antenna element that can transmit and receive signals of a band A (first band) and a band B (second band). Further, each of the antennas 2b and 2c is, for example, a secondary antenna and is an antenna element that can transmit and receive signals of the band A and the band B.

The RFIC 3 is an example of a signal processing circuit that performs processing on radio frequency signals. Specifically, the RFIC 3 performs signal processing such as down-converting and the like on a reception signal inputted via a reception path of the radio frequency circuit 1, and outputs a reception signal generated by this signal processing to the base band signal processing circuit (BBIC) 4. Moreover, the RFIC 3 performs signal processing such as up-converting and the like on a transmission signal inputted from the BBIC 4, and outputs a transmission signal generated by this signal processing to a transmission path of the radio frequency circuit 1. Further, the RFIC 3 has a control part that controls switches, amplifiers, and the like included in the radio frequency circuit 1. Note that part or all of functions of the control part of the RFIC 3 may be implemented outside of the RFIC 3. For example, part or all of the functions of the control part of the RFIC 3 may be implemented in the BBIC 4 or the radio frequency circuit 1.

The BBIC 4 is a base band signal processing circuit that performs signal processing using an intermediate frequency band, which is lower in frequency than radio frequency signals being transmitted by the radio frequency circuit 1. As the signals to be processed in the BBIC 4, for example, an image signal for image display and/or an audio signal for communication through a speaker is used.

Note that in the communication device 5 according to the present embodiment, the antennas 2a, 2b, and 2c and the BBIC 4 are not essential constituent elements.

[1.2 Circuit Configuration of Radio Frequency Circuit 1]

Next, the circuit configuration of the radio frequency circuit 1 is described. As illustrated in FIG. 1, the radio frequency circuit 1 includes filters 21, 22, 23, 32, 34, and 43, power amplifiers 51 and 52, low-noise amplifiers 61, 62, 63, and 64, a switch 10, and the antenna connection terminals 110, 120, and 130.

The antenna connection terminal 110 is an example of a first antenna terminal and is connected to the antenna 2a. The antenna connection terminal 120 is an example of a second antenna terminal and is connected to the antenna 2b. The antenna connection terminal 130 is an example of a third antenna terminal and is connected to the antenna 2c.

The filter 21 is an example of a first filter and has a pass band that includes a first uplink operation band of the band A (first band) for frequency division duplex (FDD). The filter 21 is connected to the antenna connection terminal 110 via the switch 10.

The filter 22 is an example of a fourth filter and has a pass band that includes a first downlink operation band of the band A. The filter 22 is connected to the antenna connection terminal 110 via the switch 10.

The filter 23 is an example of a fifth filter and has a pass band that includes a second downlink operation band of the band B. The filter 23 is connected to the antenna connection terminal 110 via the switch 10.

The filter 34 is an example of a second filter and has a pass band that includes a second uplink operation band of the band B. The filter 34 is connected to the antenna connection terminal 120 via the switch 10.

The filter 32 is an example of a sixth filter and has a pass band that includes the first downlink operation band of the band A. The filter 32 is connected to the antenna connection terminal 120 via the switch 10.

The filter 43 is an example of a third filter and has a pass band that includes the second downlink operation band of the band B. The filter 43 is connected to the antenna connection terminal 130 via the switch 10.

The power amplifier 51 is an example of a first power amplifier and can amplify a radio frequency transmission signal (hereinafter, referred to as "transmission signal") of the band A, which is outputted from the RFIC 3. The power amplifier 51 is connected to the filter 21.

The low-noise amplifier 61 amplifies a radio frequency reception signal (hereinafter, referred to as "reception signal") of the band A, which is inputted from the antenna connection terminal 110. The low-noise amplifier 61 is connected between the filter 22 and the RFIC 3.

The low-noise amplifier 62 amplifies a reception signal of the band B, which is inputted from the antenna connection terminal 110. The low-noise amplifier 62 is connected between the filter 23 and the RFIC 3.

The power amplifier 52 is an example of a second power amplifier and can amplify a transmission signal of the band B, which is outputted from the RFIC 3. The power amplifier 52 is connected to the filter 34.

The low-noise amplifier 63 amplifies a reception signal of the band A, which is inputted from the antenna connection terminal 120. The low-noise amplifier 63 is connected between the filter 32 and the RFIC 3.

The low-noise amplifier 64 amplifies a reception signal of the band B, which is inputted from the antenna connection terminal 130. The low-noise amplifier 64 is connected between the filter 43 and the RFIC 3.

Note that each of the band A (first band) and the band B (second band) is defined to mean a frequency band pre-defined by a standards group for constructing a communication system using radio access technology (RAT) (for example, 3GPP (Registered Trademark), IEEE (Institute of Electrical and Electronics Engineers), and the like) or any other similar group. In the present embodiment, as the communication system, for example, a 4G (4th Generation)-LTE (Long Term Evolution) system, a 5G (5th Generation)-NR (New Radio) system, a WLAN (Wireless Local Area Network) system, and the like can be used. However, the communication system is not limited thereto.

Further, the uplink operation band is defined to mean a frequency range of the foregoing band, which is designated for uplink. Further, the downlink operation band is defined to mean a frequency range of the foregoing band, which is designated for downlink.

In the radio frequency circuit 1 according to the present embodiment, the band A is, for example, Band B3 for 4G-LTE (uplink operation band: 1710-1785 MHz, downlink operation band: 1805-1880 MHz) or Band n3 for 5G-NR (uplink operation band: 1710-1785 MHz, downlink operation band: 1805-1880 MHz). Further, the band B is, for example, Band B1 of 4G-LTE (uplink operation band: 1920-1980 MHz, downlink operation band: 2110-2170 MHz) or Band n1 for 5G-NR (uplink operation band: 1920-1980 MHz, downlink operation band: 2110-2170 MHz).

Note that the antenna connection terminals 110, 120, and 130, the filters 21 to 23, 32, 34, and 43, and the power amplifiers 51 and 52 may be arranged on the same module board. As the module board, for example, a low temperature co-fired ceramics (LTCC) board, a high temperature co-fired ceramics (HTCC) board, a board including components, a board including a redistribution layer (RDL), a printed board, or the like, each of which has a multilayer structure including a plurality of dielectric layers, is used.

Further, each of the filters 21 to 23, 32, 34, and 43 may be a surface-mount-type acoustic wave filter arranged on a principal surface of the module board or may alternatively be a LC filter made up of a capacitor and an inductor formed on a surface of or formed in the inside of the module board. Further, the power amplifiers 51 and 52 may be included in a semiconductor IC arranged on a principal surface of the module board. The foregoing semiconductor IC may be configured using, for example, a CMOS (Complementary Metal Oxide Semiconductor) and more specifically, may be fabricated by SOI (Silicon on Insulator) processing. Further, the semiconductor IC may alternatively be composed of at least one of GaAs, SiGe, and GaN. Note that the semiconductor material of the semiconductor IC is not limited to the materials described above.

The switch 10 has three SPST (Single Pole Single Throw) type switch elements (a first switch element, a second switch element, and a third switch element). A terminal 10a of the first switch element is connected to the antenna connection terminal 110, and a terminal 10d of the first switch element is connected to a common terminal of the filters 21, 22, and 23 (first common terminal). A terminal 10b of the second switch element is connected to the antenna connection terminal 120, and a terminal 10e of the second switch element is connected to a common terminal of the filters 32 and 34 (second common terminal). A terminal 10c of the third switch element is connected to the antenna connection terminal 130, and a terminal 10f of the third switch element is connected to the filter 43.

Note that each of the first switch element, the second switch element, and the third switch element may alternatively be a SPnT (Single Pole n Throw) type switch element or DPnT (Double Pole n Throw) type switch element.

With the foregoing configuration, for example, based on a control signal from the RFIC 3, the switch 10 switches between connecting and disconnecting the antenna connection terminal 110 to and from the first common terminal, switches between connecting and disconnecting the antenna connection terminal 120 to and from the second common terminal, and switches between connecting and disconnecting the antenna connection terminal 130 to and from the filter 43. Note that the number of the switch elements included in the switch 10 is set appropriately in accordance with the number of the filters included in the radio frequency circuit 1.

Note that alternatively, the switch 10 may select one of connecting the terminal 10a to the terminal 10d, connecting the terminal 10a to the terminal 10e, and connecting the terminal 10a to the terminal 10f in a mutually exclusive manner, select one of connecting the terminal 10b to the terminal 10d, connecting the terminal 10b to the terminal 10e, and connecting the terminal 10b to the terminal 10f in a mutually exclusive manner, and select one of connecting the terminal 10c to the terminal 10d, connecting the terminal 10c to the terminal 10e, and connecting the terminal 10c to the terminal 10f in a mutually exclusive manner. That is to say, according to this configuration, connecting the first common terminal to one of the antennas 2a, 2b, and 2c, connecting the second common terminal to one of the antennas 2a, 2b, and 2c that has not been connected to the first common terminal, and connecting the filter 43 to one of the antennas 2a, 2b, and 2c that has not been connected to the first common terminal or the second common terminal can be achieved simultaneously. Note that in this case, the first antenna terminal is one of the antenna connection terminals 110, 120, and 130 that is connected to the first common terminal, the second antenna terminal is the antenna connection terminal that is connected to the second common terminal and is one of the antenna connection terminals 110, 120, and 130 not connected to the first common terminal, and the third antenna terminal is the antenna connection terminal that is connected to the filter 43 and is one of the antennas 2a, 2b, and 2c not connected to the first common terminal or the second common terminal.

According to the foregoing configuration of the radio frequency circuit 1, the radio frequency circuit 1 can simultaneously perform the transmission and reception of signals of the band A (via the filters 21, 22, and 32) and the transmission and reception of the band B (via the filters 34, 23, and 43).

Note that although it is not illustrated, an inductor for impedance matching may be connected between the filter 22 and the low-noise amplifier 61, between the filter 23 and the low-noise amplifier 62, between the filter 32 and the low-noise amplifier 63, and between the filter 43 and the low-noise amplifier 64. These inductors are arranged on a board on which circuit components that make up the radio frequency circuit 1 are mounted. It is desirable that, of these inductors, two inductors arranged adjacent to each other are arranged in such a way that the coil axis of one of these two inductors is arranged parallel to a mount surface of the board while the coil axis of the other of these two inductors is arranged perpendicular to the mount surface of the board.

According to this, these inductors for impedance matching can be electromagnetically coupled with each other, and thus, characteristic degradations caused by the electromagnetic coupling can be suppressed.

[1.3 Intermodulation Distortion Generated in Radio Frequency Circuit 1]

FIG. 2 is a diagram illustrating an example of generation of third-order intermodulation distortion (IMD3) in the radio frequency circuit 1 according to the embodiment. FIG. 2 illustrates a state of generation of IMD3 in the radio frequency circuit 1 according to the embodiment, in the case where a transmission signal Tx1 (frequency f1) of the band A is outputted from the antenna 2a, and a transmission signal Tx2 (frequency f2) of the band B is outputted from the antenna 2b.

Note that the transmission signal Tx1 is a signal of a predetermined channel of the band A, and the transmission signal Tx2 is a signal of a predetermined channel of the band B.

Here, for example, suppose a case where the band A is Band B3 of 4G-LTE, and the band B is Band B1 of 4G-LTE. In this case, when the simultaneous transmission of the transmission signal Tx1 and the transmission signal Tx2 is performed, two kinds of intermodulation distortions $IMD3_H$ (2×f2−f1) and $IMD3_L$ (2×f1−f2) are generated. Of these intermodulation distortions, the frequency of $IMD3_H$ is included in the downlink operation band of the band B (Band B1 of 4G-LTE), and the frequency of $IMD3_L$ is not included in the band B (Band B1 of 4G-LTE) or the band A (Band B3 of 4G-LTE). Because of this, an unwanted wave of $IMD3_H$ enters the reception path of the band B, and this causes degradation in the receiver sensitivity of the band B.

Further, for example, suppose a case where the band A is Band B66 of 4G-LTE (uplink operation band: 1710-1780 MHz, downlink operation band: 2110-2200 MHz), and the band B is Band B2 of 4G-LTE (uplink operation band: 1850-1910 MHz, downlink operation band: 1930-1990 MHz). In this case, when the simultaneous transmission of the transmission signal Tx1 and the transmission signal Tx2 is performed, two kinds of intermodulation distortions $IMD3_H$ (2×f2−f1) and $IMD3_L$ (2×f1−f2) are generated. Of these intermodulation distortions, the frequency of $IMD3_H$ is included in the downlink operation band of the band A (Band B66 of 4G-LTE), and the frequency of $IMD3_L$ is not included in the band A (Band B66 of 4G-LTE) or the band B (Band B2 of 4G-LTE). Because of this, an unwanted wave of $IMD3_H$ enters the reception path of the band A, and this causes degradation in the receiver sensitivity of the band A.

The following section describes that the radio frequency circuit 1 according to the present embodiment has the ability to suppress the degradation in receiver sensitivity.

[1.4 Intermodulation Distortion Generated in Radio Frequency Circuit 1]

Figure 3A:
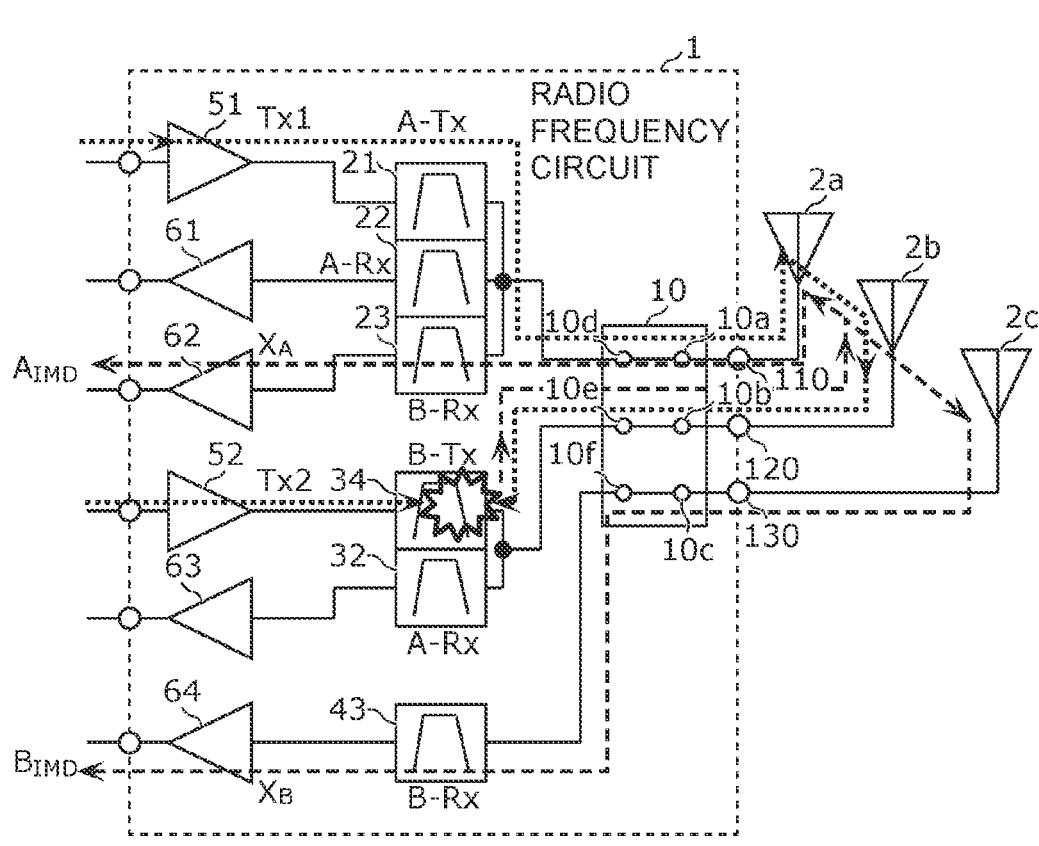
FIG. 3A is a diagram illustrating a first circuit state of the radio frequency circuit according to the embodiment.

FIG. 3A is a diagram illustrating a first circuit state of the radio frequency circuit 1 according to the embodiment. FIG. 3A illustrates the first circuit state where $IMD3_H$, which is generated when the transmission signal Tx1 and the transmission signal Tx2 are simultaneously transmitted, enters the reception path of Band B.

As illustrated in FIG. 3A, when the transmission signal Tx1 of the band A is transmitted via a transmission path including the power amplifier 51, the filter 21, the switch 10, and the antenna 2a, the transmission signal Tx1 leaks to the antenna 2b, the switch 10, and the filter 34 by way of coupling between the antenna 2a and the antenna 2b. On the other hand, the transmission signal Tx2 of the band B is transmitted via a transmission path including the power amplifier 52 and the filter 34. At that time, in the filter 34, IMD3 is generated due to mutual interference between the transmission signal Tx2 and a leaked transmission signal Tx1.

For example, in the case where the band A is Band B3 of 4G-LTE and the band B is Band B1 of 4G-LTE, $IMD3_H$ of the generated IMD3 includes a part that passes the filter 23 and the low-noise amplifier 62 (path $X_A$: unwanted wave $A_{IMD}$) and a part that passes the filter 43 and the low-noise amplifier 64 (path $X_B$: unwanted wave $B_{IMD}$).

Here, the intensities of the unwanted waves $A_{IMD}$ and $B_{IMD}$ are calculated. First, the intensity $P_{IMD}$ of $IMD3_H$ generated in the filter 34 is calculated using the following Equation 1. Note that $P_{Tx1}$ and $P_{Tx2}$ are the intensities of the transmission signals Tx1 and Tx2, respectively, and IIP3 is the third-order input intercept point.

$$P_{IMD} = 2 \times P_{Tx2} + P_{Tx1} - 2 \times IIP3 \qquad \text{(Equation 1)}$$

For calculation of $P_{IMD}$ using Equation 1, we assume that the following precondition is satisfied.

AntISO=15 dBm, Filter IIP3=74 dBm, $P_{PA}$=27 dBm, Filter IL=2 dB, Filter Subsequent Stage IL=2 dB, Target Value of IMD3 in Subsequent Stage of Low-noise Amplifier=−110 dBm     (Equation 2)

Here, in Equation 2, AntISO is the isolation between the antennas 2a, 2b, and 2c, Filter IIP3 is IIP3 of a filter, Filter IL is the insertion loss of a filter, $P_{PA}$ is the output power of a power amplifier, and Filter Subsequent Stage IL is the transmission loss in the subsequent path of a filter.

According to Equation 1 and Equation 2, the intensity $P_{IMD}$ is calculated as in Equation 3.

$$P_{IMD}=2\times(P_{PA}\text{(power amplifier 52)}-\text{Filter }IL\text{(filter 34)})+(P_{PA}\text{(power amplifier 51)}-\text{Filter }IL\text{(filter 21)}-\text{Filter Subsequent Stage }IL-\text{AntISO(between antennas }2a\text{ and }2b)-\text{Filter Subsequent Stage }IL)-2\times\text{Filter }IIP3\text{(filter 34)}=-92\text{ dBm} \quad\text{(Equation 3)}$$

Because of this, the intensities $P_{AIMD}$ and $P_{BIMD}$ of the unwanted waves $A_{IMD}$ and $B_{IMD}$ are calculated as in Equation 4 and Equation 5, respectively.

$$P_{AIMD}=P_{IMD}-\text{(Filter Subsequent Stage }IL+\text{AntISO(between antennas }2a\text{ and }2b)+\text{Filter }IL\text{(filter 21)}+\text{Filter Subsequent Stage }IL)=-113\text{ dBm} \quad\text{(Equation 4)}$$

$$P_{BIMD}=P_{IMD}-\text{(Filter Subsequent Stage }IL+\text{AntISO(between antennas }2b\text{ and }2c)+\text{Filter }IL\text{(filter 43)}+\text{Filter Subsequent Stage }IL)=-113\text{ dBm} \quad\text{(Equation 5)}$$

According to the calculation results of Equation 4 and Equation 5, both the intensity of the unwanted wave $A_{IMD}$ that passes the low-noise amplifier 62 and the intensity of the unwanted wave $B_{IMD}$ that passes the low-noise amplifier 64 become lower than the IMD3 target Value (−110 dBm).

That is to say, in the radio frequency circuit 1 according to the present embodiment, the transmission path of the band B (power amplifier 52+filter 34) and the reception paths of the band B that includes the frequency of IMD3$_H$ (filter 23+low-noise amplifier 62 and filter 43+low-noise amplifier 64) are connected to different antennas. Because of this, it becomes possible to secure a large isolation between the transmission path and the reception paths of the band B and make the intensities of the unwanted waves $A_{IMD}$ and $B_{IMD}$ that enter the reception paths of the band B lower than the target value. Accordingly, it becomes possible to provide the radio frequency circuit 1 and the communication device 5, each of which enables 2-uplink transmission and in each of which degradation in receiver sensitivity is suppressed.

Figure 3B:
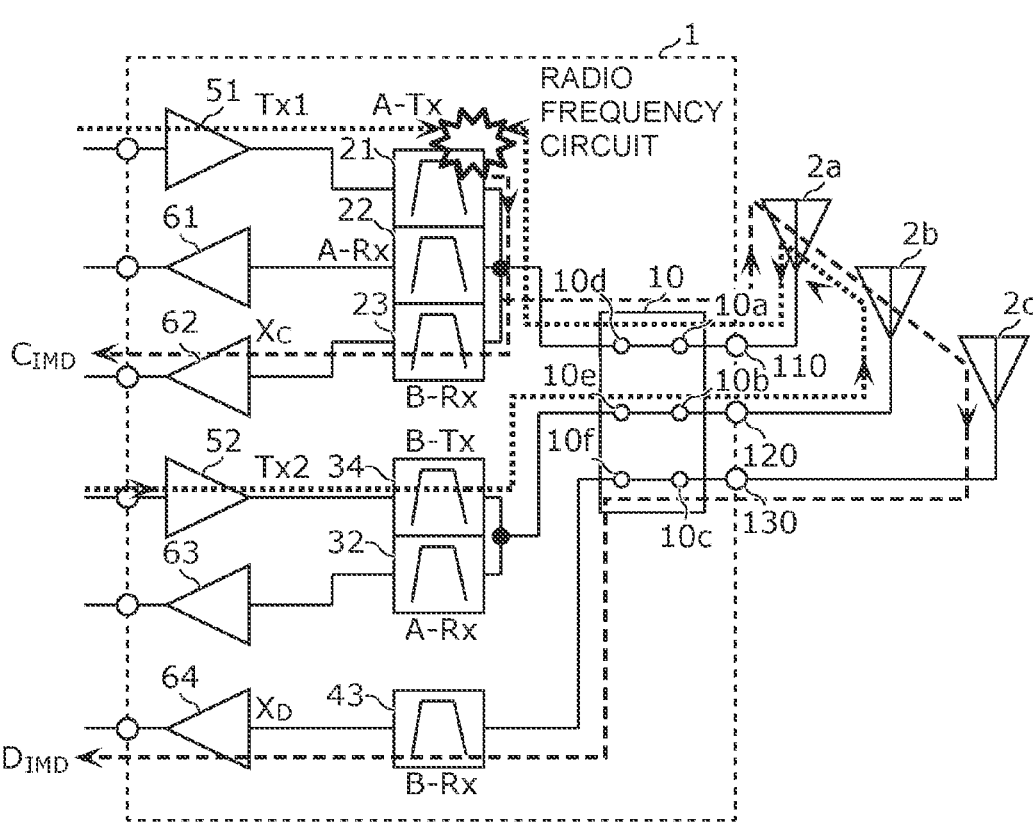
FIG. 3B is a diagram illustrating a second circuit state of the radio frequency circuit according to the embodiment.

FIG. 3B is a diagram illustrating a second circuit state of the radio frequency circuit 1 according to the embodiment. FIG. 3B illustrates the second circuit state where IMD3$_H$, which is generated when the transmission signal Tx1 and the transmission signal Tx2 are simultaneously transmitted, enters the reception paths of Band B.

As illustrated in FIG. 3B, when the transmission signal Tx2 of the band B is transmitted via a transmission path including the power amplifier 52, the filter 34, the switch 10, and the antenna 2a, the transmission signal Tx2 leaks to the antenna 2a, the switch 10, and the filter 21 by way of coupling between the antenna 2a and the antenna 2b. On the other hand, the transmission signal Tx1 of the band A is transmitted via a transmission path including the power amplifier 51 and the filter 21. At that time, in the filter 21, IMD3 is generated due to mutual interference between the transmission signal Tx1 and a leaked transmission signal Tx2.

For example, in the case where the band A is Band B3 of 4G-LTE and the band B is Band B1 of 4G-LTE, IMD3$_H$ of the generated IMD3 includes a part that passes the filter 23 and the low-noise amplifier 62 (path X$_C$: unwanted wave C$_{IMD}$) and a part that passes the filter 43 and the low-noise amplifier 64 (path X$_D$: unwanted wave D$_{IMD}$).

Here, the intensities of the unwanted waves C$_{IMD}$ and D$_{IMD}$ are calculated. First, the intensity P$_{IMD}$ of IMD3$_H$ generated in the filter 21 is calculated using the Equation 1.

According to Equation 1 and Equation 2, the intensity P$_{IMD}$ is calculated as in Equation 6.

$$P_{IMD}=2\times(P_{PA}\text{(power amplifier 52)}-\text{Filter }IL\text{(filter 34)}-\text{Filter Subsequent Stage }IL-\text{AntISO(between antennas }2a\text{ and }2b)-\text{Filter Subsequent Stage }IL)+(P_{PA}\text{(power amplifier 51)}-\text{Filter }IL\text{(filter 21)})-2\times\text{Filter }IIP3=-111\text{ dBm} \quad\text{(Equation 6)}$$

Because of this, the intensities P$_{CIMD}$ and P$_{DIMD}$ of the unwanted waves C$_{IMD}$ and D$_{IMD}$ are calculated as in Equation 7 and Equation 8, respectively.

$$P_{CIMD}=P_{IMD}-\text{(Filter }IL\text{(filter 23))}=-113\text{ dBm} \quad\text{(Equation 7)}$$

$$P_{DIMD}=P_{IMD}-\text{(Filter Subsequent Stage }IL+\text{AntISO(between antennas }2a\text{ and }2c)+\text{Filter }IL\text{(filter 43)}+\text{Filter Subsequent Stage }IL)=-132\text{ dBm} \quad\text{(Equation 8)}$$

According to the calculation results of Equation 7 and Equation 8, both the intensity of the unwanted wave CIMD that passes the low-noise amplifier 62 and the intensity of the unwanted wave DIMD that passes the low-noise amplifier 64 become lower than the IMD3 target Value (−110 dBm).

That is to say, in the radio frequency circuit 1 according to the present embodiment, the transmission path of the band B (power amplifier 52+filter 34) and the reception paths of the band B that includes the frequency of IMD3$_H$ (filter 23+low-noise amplifier 62 and filter 43+low-noise amplifier 64) are connected to different antennas. Because of this, it becomes possible to secure a large isolation between the transmission path and the reception paths of the band B and make the intensities of the unwanted waves CIMD and DIMD that enter the reception paths of the band B lower than the target value. Accordingly, it becomes possible to provide the radio frequency circuit 1 and the communication device 5, each of which enables 2-uplink transmission and in each of which degradation in receiver sensitivity is suppressed.

Figure 4:
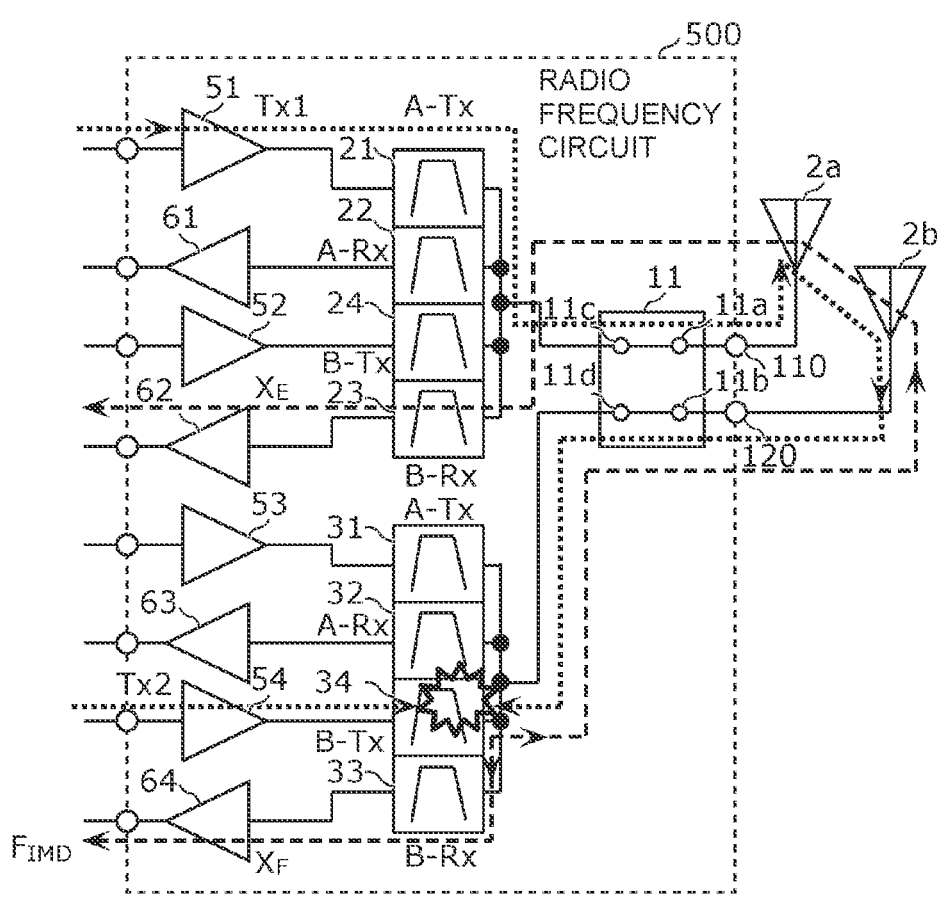
FIG. 4 is a diagram illustrating an example of circuit state of a radio frequency circuit according to a comparative example.

FIG. 4 is a diagram illustrating an example of the circuit state of a radio frequency circuit 500 according to a comparative example. The radio frequency circuit 500 according to the comparative example is an existing radio frequency circuit. As illustrated in FIG. 4, the radio frequency circuit 500 according to the comparative example includes filters 21, 22, 23, 24, 31, 32, 33, and 34, power amplifiers 51, 52, 53, and 54, low-noise amplifiers 61, 62, 63, and 64, a switch 11, and antenna connection terminals 110 and 120. The radio frequency circuit 500 according to the comparative example is mainly different from the radio frequency circuit 1 according to the embodiment in that the filter 43 is not included and the filters 24, 31, and 33 are added. In the following section, the radio frequency circuit 500 according to the comparative example is described with an emphasis on points different from the radio frequency circuit 1 according to the embodiment, and the description regarding the same points as the radio frequency circuit 1 according to the embodiment is omitted.

The antenna connection terminal 110 is connected to the antenna 2a. The antenna connection terminal 120 is connected to the antenna 2b.

The filter 21 has a pass band that includes the first uplink operation band of the band A. The filter 21 is connected to the antenna connection terminal 110 via the switch 11.

The filter 22 has a pass band that includes the first downlink operation band of the band A. The filter 22 is connected to the antenna connection terminal 110 via the switch 11.

The filter 23 has a pass band that includes the second downlink operation band of the band B. The filter 23 is connected to the antenna connection terminal 110 via the switch 11.

The filter 24 has a pass band that includes the second uplink operation band of the band B. The filter 24 is connected to the antenna connection terminal 110 via the switch 11.

The filter 31 has a pass band that includes the first uplink operation band of the band A. The filter 31 is connected to the antenna connection terminal 120 via the switch 11.

The filter 32 has a pass band that includes the first downlink operation band of the band A. The filter 32 is connected to the antenna connection terminal 120 via the switch 11.

The filter 33 has a pass band that includes the second downlink operation band of the band B. The filter 33 is connected to the antenna connection terminal 120 via the switch 11.

The filter 34 has a pass band that includes the second uplink operation band of the band B. The filter 34 is connected to the antenna connection terminal 120 via the switch 11.

The power amplifier 52 can amplify a transmission signal of the band B outputted from the RFIC 3. The power amplifier 52 is connected to the filter 24.

The power amplifier 53 can amplify a transmission signal of the band A outputted from the RFIC 3. The power amplifier 53 is connected to the filter 31.

The power amplifier 54 can amplify a transmission signal of the band B outputted from the RFIC 3. The power amplifier 54 is connected to the filter 34.

As illustrated in FIG. 4, when a transmission signal Tx1 of the band A is transmitted via a transmission path including the power amplifier 51, the filter 21, the switch 11, and the antenna 2a, the transmission signal Tx1 leaks to the antenna 2b, the switch 11, and the filter 34 by way of coupling between the antenna 2a and the antenna 2b. On the other hand, a transmission signal Tx2 of the band B is transmitted via a transmission path including the power amplifier 54 and the filter 34. At that time, in the filter 34, IMD3 is generated due to mutual interference between the transmission signal Tx2 and a leaked transmission signal Tx1.

For example, in the case where the band A is Band B3 of 4G-LTE and the band B is Band B1 of 4G-LTE, IMD3$_H$ of the generated IMD3 includes a part that passes the filter 23 and the low-noise amplifier 62 (path X$_E$) and a part that passes the filter 33 and the low-noise amplifier 64 (path X$_F$: unwanted wave F$_{IMD}$).

Here, the intensity of the unwanted wave F$_{IMD}$ is calculated. First, the intensity P$_{IMD}$ of IMD3$_H$ generated in the filter 34 is calculated using Equation 9.

$$P_{IMD}=2\times(P_{PA}(\text{power amplifier 54})-\text{Filter }IL(\text{filter 34}))+(P_{PA}(\text{power amplifier 51})-\text{Filter }IL(\text{filter 21})-\text{Filter Subsequent Stage }IL-\text{AntISO(between antennas 2}a\text{and 2}b)-\text{Filter Subsequent Stage }IL)-2\times\text{Filter }IIP3=-92\text{ dBm} \quad \text{(Equation 9)}$$

According to Equation 9 and Equation 2, the intensity P$_{FIMD}$ of the unwanted wave F$_{IMD}$ is calculated as in Equation 10.

$$P_{FIMD}=P_{IMD}-\text{Filter }IL(\text{filter 33})=-94\text{ dBm} \quad \text{(Equation 10)}$$

According to the calculation result of Equation 10, the intensity of the unwanted wave FIMD that passes the low-noise amplifier 64 becomes higher than the IMD3 target Value (−110 dBm).

That is to say, in the radio frequency circuit 500 according to the comparative example, the transmission path of the band B (power amplifier 54+filter 34) and the reception path of the band B that includes the frequency of IMD3$_H$ (filter 33+low-noise amplifier 64) are connected to the same antenna 2b. Thus, a sufficient isolation cannot be secured between the transmission path and the reception path of the band B. Accordingly, the intensity of the unwanted wave FIMD that enters the reception path of the band B cannot be reduced below the target value.

[1.5 Radio Frequency Circuit 1A According to Modified Example 1]

Figure 5:
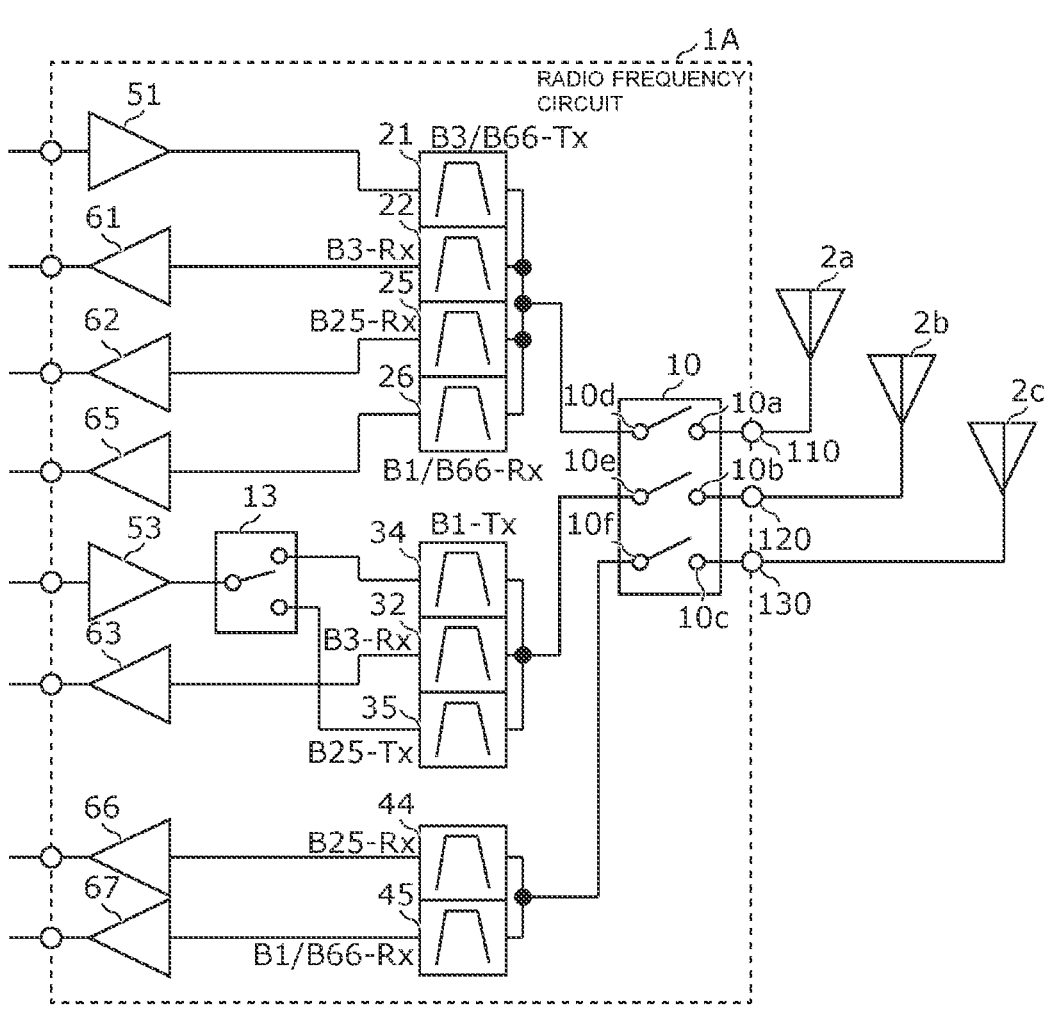
FIG. 5 is a circuit configuration diagram of a radio frequency circuit according to a modified example 1 of the embodiment.

FIG. 5 is a circuit configuration diagram of a radio frequency circuit 1A according to a modified example 1 of the embodiment. As illustrated in FIG. 5, the radio frequency circuit 1A according to the present modified example includes filters 21, 22, 25, 26, 32, 34, 35, 44, and 45, power amplifiers 51 and 53, low-noise amplifiers 61, 62, 63, 65, 66, and 67, a switch 10, and antenna connection terminals 110, 120, and 130. The radio frequency circuit 1A according to the present modified example is mainly different from the radio frequency circuit 1 according to the embodiment in that the filters 23 and 43 are not included and the filters 25, 26, 35, 44, and 45 are added. In the following section, the radio frequency circuit 1A according to the present modified example is described with an emphasis on points different from the radio frequency circuit 1 according to the embodiment, and the description regarding the same points as the radio frequency circuit 1 according to the embodiment is omitted.

The filter 21 is an example of the first filter and has a pass band that includes the first uplink operation band of the band A (first band) and a third uplink operation band of a band C (third band). The filter 21 is connected to the antenna connection terminal 110 via the switch 10.

The filter 22 is an example of the fourth filter and has a pass band that includes the first downlink operation band of the band A. The filter 22 is connected to the antenna connection terminal 110 via the switch 10.

The filter 25 is an example of a seventh filter and has a pass band that includes a fourth downlink operation band of a band D (fourth band). The filter 25 is connected to the antenna connection terminal 110 via the switch 10.

The filter 26 is an example of the fifth filter and has a pass band that includes the second downlink operation band of the band B and a third downlink operation band of the band C (third band). The filter 26 is connected to the antenna connection terminal 110 via the switch 10.

The filter 34 is an example of the second filter and has a pass band that includes the second uplink operation band of the band B. The filter 34 is connected to the antenna connection terminal 120 via the switch 10.

The filter 32 is an example of the sixth filter and has a pass band that includes the first downlink operation band of the band A. The filter 32 is connected to the antenna connection terminal 120 via the switch 10.

The filter 35 is an example of an eighth filter and has a pass band that includes a fourth uplink operation band of the band D. The filter 35 is connected to the antenna connection terminal 120 via the switch 10.

The filter 45 is an example of the third filter and has a pass band that includes the second downlink operation band of the band B and the third downlink operation band of the band C. The filter 45 is connected to the antenna connection terminal 130 via the switch 10.

The filter 44 is an example of a ninth filter and has a pass band that includes a fourth downlink operation band of the band D. The filter 44 is connected to the antenna connection terminal 130 via the switch 10.

The power amplifier 51 is an example of the first power amplifier and can amplify transmission signals of the band A and the band C, which are outputted from the RFIC 3. The power amplifier 51 is connected to the filter 21.

The low-noise amplifier 61 amplifies a reception signal of the band A, which is inputted from the antenna connection terminal 110. The low-noise amplifier 61 is connected between the filter 22 and the RFIC 3.

The low-noise amplifier 62 amplifies a reception signal of the band D, which is inputted from the antenna connection terminal 110. The low-noise amplifier 62 is connected between the filter 25 and the RFIC 3.

The low-noise amplifier 65 amplifies reception signals of the band B and the band C, which are inputted from the antenna connection terminal 110. The low-noise amplifier 65 is connected between the filter 26 and the RFIC 3.

The power amplifier 53 is an example of the second power amplifier and can amplify transmission signals of the band B and the band D, which are outputted from the RFIC 3. The power amplifier 53 is connected to the filters 34 and 35 via a switch 13.

The low-noise amplifier 63 amplifies a reception signal of the band A, which is inputted from the antenna connection terminal 120. The low-noise amplifier 63 is connected between the filter 32 and the RFIC 3.

The low-noise amplifier 66 amplifies a reception signal of the band D, which is inputted from the antenna connection terminal 130. The low-noise amplifier 66 is connected between the filter 44 and the RFIC 3.

The low-noise amplifier 67 amplifies reception signals of the band B and the band C, which are inputted from the antenna connection terminal 130. The low-noise amplifier 67 is connected between the filter 45 and the RFIC 3.

The switch 13 is connected between the power amplifier 53 and the filters 34 and 35 and switches between connecting the power amplifier 53 to the filter 34 and connecting the power amplifier 53 to the filter 35.

In the radio frequency circuit 1A according to the present embodiment, the band A is, for example, Band B3 for 4G-LTE or Band n3 for 5G-NR. Further, the band B is, for example, Band B1 of 4G-LTE or Band n1 for 5G-NR. Further, the band C is, for example, Band B66 of 4G-LTE (third uplink operation band: 1710-1780 MHz, third downlink operation band: 2110-2200 MHz) or Band n66 for 5G-NR (third uplink operation band: 1710-1780 MHz, third downlink operation band: 2110-2200 MHz). Further, the band D is, for example, Band B25 of 4G-LTE (fourth uplink operation band: 1850-1915 MHz, fourth downlink operation band: 1930-1995 MHz) or Band n25 for 5G-NR (fourth uplink operation band: 1850-1915 MHz, fourth downlink operation band: 1930-1995 MHz).

Note that the band C may alternatively be Band B4 of 4G-LTE (third uplink operation band: 1710-1755 MHz, third downlink operation band: 2110-2155 MHz) or Band n4 of 5G-NR (third uplink operation band: 1710-1755 MHz, third downlink operation band: 2110-2155 MHz). Further, the band D may alternatively be Band B2 of 4G-LTE (fourth uplink operation band: 1850-1910 MHz, fourth downlink operation band: 1930-1990 MHz) or Band n2 of 5G-NR (fourth uplink operation band: 1850-1910 MHz, fourth downlink operation band: 1930-1990 MHz).

According to the foregoing configuration of the radio frequency circuit 1A, the radio frequency circuit 1A can simultaneously perform the transmission and reception of signals of the band A (filters 21, 22, and 32) and the transmission and reception of the band B (via the filters 26, 34, and 45). Moreover, the radio frequency circuit 1A can simultaneously perform the transmission and reception of signals of the band C (filters 21, 26, and 45) and the transmission and reception of the band D (via the filters 25, 35, and 44).

In the radio frequency circuit 1A according to the present modified example, a transmission path of the band B (power amplifier 53+filter 34) and reception paths of the band B that includes the frequency of $IMD3_H$ (filter 26+low-noise amplifier 65 and filter 45+low-noise amplifier 67) are connected to different antennas. Because of this, a large isolation can be secured between the transmission path and the reception paths of the band B. Accordingly, the intensity of $IMD3_H$ that enters the reception path of the band B can be reduced below the target value.

Further, a transmission path of the band D (power amplifier 53+filter 35) and reception paths of the band C that includes the frequency of $IMD3_H$ (filter 26+low-noise amplifier 65 and filter 45+low-noise amplifier 67) are connected to different antennas. Because of this, it becomes possible to secure a large isolation between the transmission path of the band D and the reception paths of the band C and make the intensity of $IMD3_H$ that enters the reception path of the band C lower than the target value. Accordingly, it becomes possible to provide the radio frequency circuit LA which enables 2-uplink transmission and in which degradation in receiver sensitivity is suppressed.

[1.6 Circuit Configurations of Radio Frequency Circuit 6 and Communication Device 8 According to Modified Example 2]

Figure 6:
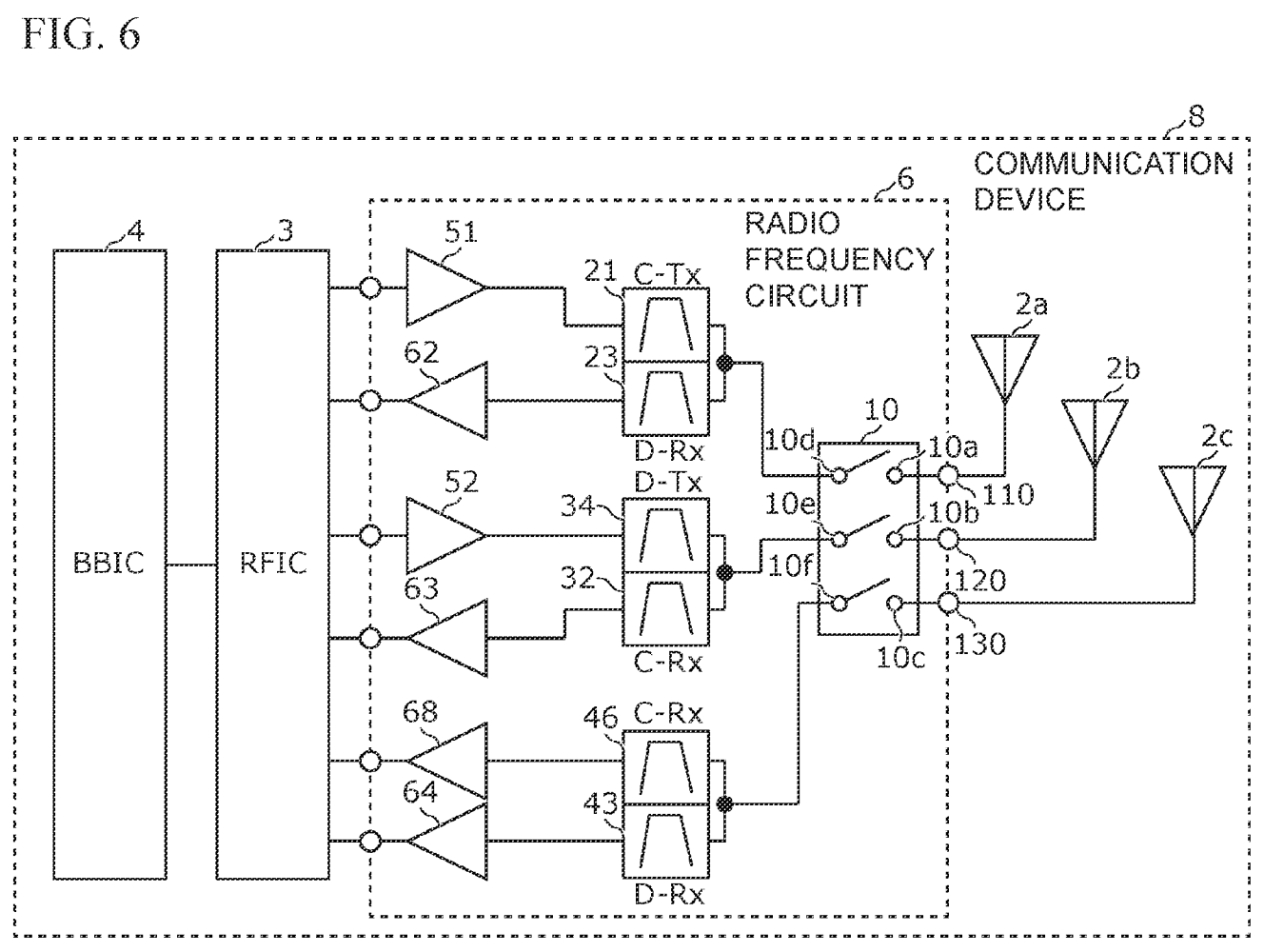

Circuit configurations of a radio frequency circuit 6 and a communication device 8 according to a modified example 2 are described with reference to FIG. 6. FIG. 6 is a circuit configuration diagram of the radio frequency circuit 6 and the communication device 8 according to the modified example 2 of the embodiment. As illustrated in FIG. 6, the communication device 8 according to the present modified example includes the radio frequency circuit 6, antennas 2a, 2b, and 2c, a RFIC 3, and a BBIC 4. The communication device 8 according to the present modified example is different from the communication device 5 according to the embodiment only in the configuration of the radio frequency circuit 6. In the following section, the communication device 8 according to the present modified example is described with an emphasis on the configuration of the radio frequency circuit 6.

As illustrated in FIG. 6, the radio frequency circuit 6 includes filters 21, 23, 32, 34, 43, and 46, power amplifiers 51 and 52, low-noise amplifiers 62, 63, 64 and 68, a switch 10, and antenna connection terminals 110, 120, and 130. The radio frequency circuit 6 according to the present modified example is mainly different from the radio frequency circuit 1 according to the embodiment in that the filter 22 is not included and the filter 46 is added. In the following section, the radio frequency circuit 6 according to the present modified example is described with an emphasis on points different from the radio frequency circuit 1 according to the embodiment, and the description regarding the same points as the radio frequency circuit 1 according to the embodiment is omitted.

The filter 21 is an example of the first filter and has a pass band that includes a first uplink operation band of the band C (first band). The filter 21 is connected to the antenna connection terminal 110 via the switch 10.

The filter 23 is an example of the fifth filter and has a pass band that includes a second downlink operation band of the band D (second band). The filter 23 is connected to the antenna connection terminal 110 via the switch 10.

The filter 34 is an example of the second filter and has a pass band that includes a second uplink operation band of the band D. The filter 34 is connected to the antenna connection terminal 120 via the switch 10.

The filter 32 is an example of the sixth filter and has a pass band that includes a first downlink operation band of the band C. The filter 32 is connected to the antenna connection terminal 120 via the switch 10.

The filter 43 is an example of the third filter and has a pass band that includes the second downlink operation band of the band D. The filter 43 is connected to the antenna connection terminal 130 via the switch 10.

The filter 46 is an example of a tenth filter and has a pass band that includes the first downlink operation band of the band C. The filter 46 is connected to the antenna connection terminal 130 via the switch 10.

The power amplifier 51 is an example of the first power amplifier and can amplify a transmission signal of the band C, which is outputted from the RFIC 3. The power amplifier 51 is connected to the filter 21.

The low-noise amplifier 62 amplifies a reception signal of the band D, which is inputted from the antenna connection terminal 110. The low-noise amplifier 62 is connected between the filter 23 and the RFIC 3.

The power amplifier 52 is an example of the second power amplifier and can amplify a transmission signal of the band D, which is outputted from the RFIC 3. The power amplifier 52 is connected to the filter 34.

The low-noise amplifier 63 amplifies a reception signal of the band C, which is inputted from the antenna connection terminal 120. The low-noise amplifier 63 is connected between the filter 32 and the RFIC 3.

The low-noise amplifier 64 amplifies a reception signal of the band D, which is inputted from the antenna connection terminal 130. The low-noise amplifier 64 is connected between the filter 43 and the RFIC 3.

The low-noise amplifier 68 amplifies a reception signal of the band C, which is inputted from the antenna connection terminal 130. The low-noise amplifier 68 is connected between the filter 46 and the RFIC 3.

In the radio frequency circuit 6 according to the present modified example, the band C is, for example, Band B20 for 4G-LTE (uplink operation band: 832-862 MHz, downlink operation band: 791-821 MHz) or Band n20 for 5G-NR (uplink operation band: 832-862 MHz, downlink operation band: 791-821 MHz). Further, the band D is, for example, Band B8 of 4G-LTE (uplink operation band: 880-915 MHz, downlink operation band: 925-960 MHz) or Band n8 for 5G-NR (uplink operation band: 880-915 MHz, downlink operation band: 925-960 MHz).

Further, besides the bands exemplified in the above, each of the band C and the banc D may alternatively be a band that belongs to a low band group (700 MHz to 1 GHz).

Note that the antenna connection terminals 110, 120, and 130, the filters 21, 23, 32, 34, 43, and 46, and the power amplifiers 51 and 52 may be arranged on the same module board.

The switch 10 has three SPST type switch elements (a first switch element, a second switch element, and a third switch element). A terminal 10a of the first switch element is connected to the antenna connection terminal 110, and a terminal 10d of the first switch element is connected to a common terminal of the filters 21 and 23 (first common terminal). A terminal 10b of the second switch element is connected to the antenna connection terminal 120, and a terminal 10e of the second switch element is connected to a common terminal of the filters 32 and 34 (second common terminal). A terminal 10c of the third switch element is connected to the antenna connection terminal 130, and a terminal 10f of the third switch element is connected to a common terminal of the filters 43 and 46 (third common terminal).

With the foregoing configuration, for example, based on a control signal from the RFIC 3, the switch 10 switches between connecting and disconnecting the antenna connection terminal 110 to and from the first common terminal, switches between connecting and disconnecting the antenna connection terminal 120 to and from the second common terminal, and switches between connecting and disconnecting the antenna connection terminal 130 to and from the third common terminal. Note that the number of the switch elements included in the switch 10 is set appropriately in accordance with the number of the filters included in the radio frequency circuit 6.

According to the foregoing configuration of the radio frequency circuit 6, the radio frequency circuit 6 can simultaneously perform the transmission and reception of signals of the band C (via the filters 21, 32, and 46) and the transmission and reception of the band D (via the filters 23, 34, and 43).

Figure 7:
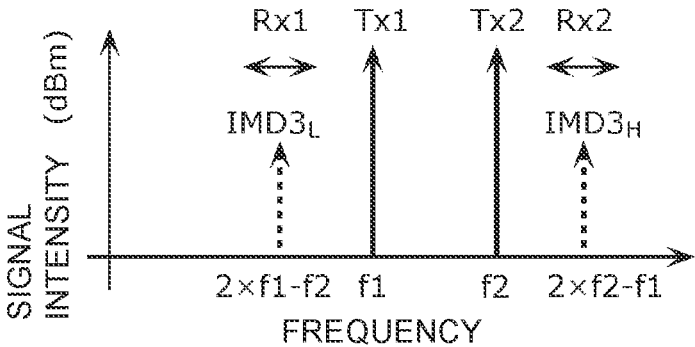
FIG. 7 is a diagram illustrating an example of generation of third-order intermodulation distortion in the radio frequency circuit according to the modified example 2 of the embodiment.

FIG. 7 is a diagram illustrating an example of generation of IMD3 in the radio frequency circuit 6 according to the modified example 2 of the embodiment. FIG. 7 illustrates a state of generation of IMD3 in the radio frequency circuit 6 according to the modified example 2, in the case where a transmission signal Tx1 (frequency f1) of the band C is outputted from the antenna 2a, and a transmission signal Tx2 (frequency f2) of the band D is outputted from the antenna 2b.

Note that the transmission signal Tx1 is a signal of a predetermined channel of the band C, and the transmission signal Tx2 is a signal of a predetermined channel of the band D.

Here, for example, suppose a case where the band C is Band B20 of 4G-LTE, and the band D is Band B8 of 4G-LTE. In this case, when the simultaneous transmission of the transmission signal Tx1 and the transmission signal Tx2 is performed, two kinds of intermodulation distortions $IMD3_H$ ($2 \times f2 - f1$) and $IMD3_L$ ($2 \times f1 - f2$) are generated. Of these intermodulation distortions, the frequency of $IMD3_H$ is included in the downlink operation band of the band D (Band B8 of 4G-LTE), and the frequency of $IMD3_L$ is included in the downlink operation band of the band C (Band B20 of 4G-LTE). Because of this, an unwanted wave of $IMD3_H$ enters the reception path of the band D, and this causes degradation in the receiver sensitivity of the band D. Further, an unwanted wave of $IMD3_L$ enters the reception path of the band C, and this causes degradation in the receiver sensitivity of the band C.

In response to this, in the radio frequency circuit 6 according to the present modified example, the transmission path of the band C (power amplifier 51+filter 21) and the reception paths of the band C that includes the frequency of $IMD3_L$ (filter 32+low-noise amplifier 63 and filter 46+low-noise amplifier 68) are connected to different antennas. Because of this, it becomes possible to secure a large isolation between the transmission path and the reception paths of the band C. Accordingly, the intensities of the unwanted waves of $IMD3_L$ that enter the reception paths of the band C can be reduced below the target value of IMD3 in the subsequent stage of the low-noise amplifier (for example, −110 dBm).

Further, in the radio frequency circuit 6 according to the present modified example, the transmission path of the band D (power amplifier 52+filter 34) and the reception paths of the band D that includes the frequency of $IMD3_H$ (filter 23+low-noise amplifier 62 and filter 43+low-noise amplifier 64) are connected to different antennas. Because of this, it becomes possible to secure a large isolation between the transmission path and the reception paths of the band D and make the intensities of unwanted waves of $IMD3_H$ that enter the reception paths of the band D lower than the target value of IMD3 in the subsequent stage of the low-noise amplifier (for example, −110 dBm). Accordingly, it becomes possible to provide the radio frequency circuit 6 and the communication device 8, each of which enables 2-uplink transmission and in each of which degradation in receiver sensitivity is suppressed.

[1.7 Circuit Configurations of Radio Frequency Circuit 7 and Communication Device 9 According to Modified Example 3]

Figure 8:
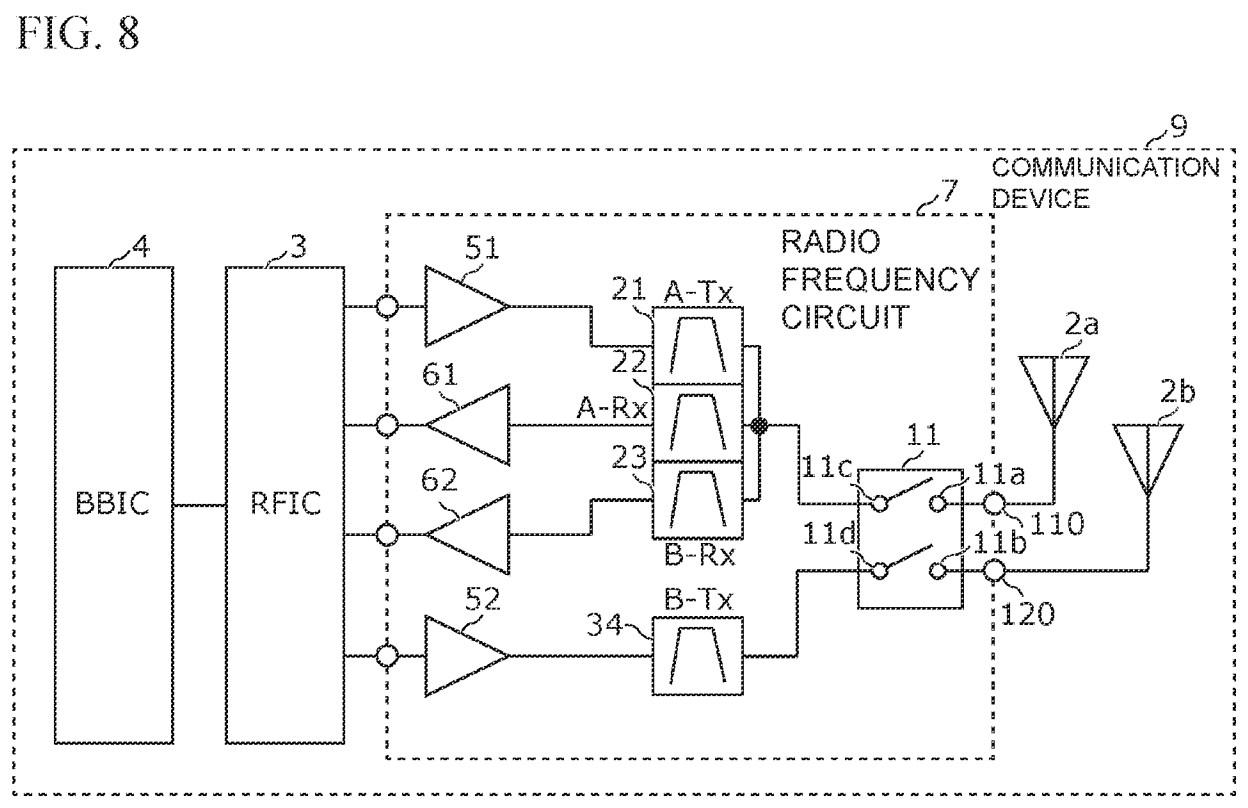

Circuit configurations of a radio frequency circuit 7 and a communication device 9 according to a modified example 3 are described with reference to FIG. 8. FIG. 8 is a circuit configuration diagram of the radio frequency circuit 7 and the communication device 9 according to the modified example 3 of the embodiment. As illustrated in FIG. 8, the communication device 9 according to the present modified example includes the radio frequency circuit 7, antennas 2a and 2b, a RFIC 3, and a BBIC 4. The communication device 9 according to the present modified example is different from the communication device 5 according to the embodiment in that the antenna 2c is not included and the radio frequency circuit 7 has a different configuration. In the following section, the communication device 9 according to the present modified example is described with an emphasis on the configuration of the radio frequency circuit 7.

As illustrated in FIG. 8, the radio frequency circuit 7 includes filters 21, 22, 23, and 34, power amplifiers 51 and 52, low-noise amplifiers 61 and 62, a switch 11, and antenna connection terminals 110 and 120. The radio frequency circuit 7 according to the present modified example is mainly different from the radio frequency circuit 1 according to the embodiment in that the filters 32 and 43 are not included. In the following section, the radio frequency circuit 7 according to the present modified example is described with an emphasis on points different from the radio frequency circuit 1 according to the embodiment, and the description regarding the same points as the radio frequency circuit 1 according to the embodiment is omitted.

The antenna connection terminal 110 is an example of the first antenna terminal and is connected to the antenna 2a. The antenna connection terminal 120 is an example of the second antenna terminal and is connected to the antenna 2b.

The filter 21 is an example of the first filter and has a pass band that includes the first uplink operation band of the band A (first band). The filter 21 is connected to the antenna connection terminal 110 via the switch 11. The filter 22 has a pass band that includes the first downlink operation band of the band A. The filter 22 is connected to the antenna connection terminal 110 via the switch 11.

The filter 23 is an example of the third filter and has a pass band that includes the second downlink operation band of the band B (second band). The filter 23 is connected to the antenna connection terminal 110 via the switch 11.

The filter 34 is an example of the second filter and has a pass band that includes the second uplink operation band of the band B. The filter 34 is connected to the antenna connection terminal 120 via the switch 11.

The power amplifier 51 is an example of the first power amplifier and can amplify a transmission signal of the band A, which is outputted from the RFIC 3. The power amplifier 51 is connected to the filter 21.

The low-noise amplifier 61 amplifies a reception signal of the band A, which is inputted from the antenna connection terminal 110. The low-noise amplifier 61 is connected between the filter 22 and the RFIC 3.

The low-noise amplifier 62 amplifies a reception signal of the band B, which is inputted from the antenna connection terminal 110. The low-noise amplifier 62 is connected between the filter 23 and the RFIC 3.

The power amplifier 52 is an example of the second power amplifier and can amplify a transmission signal of the band B, which is outputted from the RFIC 3. The power amplifier 52 is connected to the filter 34.

Further, the filter having a pass band that includes the second downlink operation band is not connected to the antenna connection terminal 120.

In the radio frequency circuit 7 according to the present modified example, the band A is, for example, Band B3 for 4G-LTE or Band n3 for 5G-NR. Further, the band B is, for example, Band B1 of 4G-LTE or Band n1 for 5G-NR.

Note that the antenna connection terminals 110 and 120, the filters 21, 22, 23, and 34, and the power amplifiers 51 and 52 may be arranged on the same module board.

The switch 11 has two SPST type switch elements (a first switch element and a second switch element). A terminal 11a of the first switch element is connected to the antenna connection terminal 110, and a terminal 11c of the first switch element is connected to a common terminal of the filters 21, 22, and 23 (first common terminal). A terminal 11b of the second switch element is connected to the antenna connection terminal 120, and a terminal 11d of the second switch element is connected to the filter 34.

With the foregoing configuration, for example, based on a control signal from the RFIC 3, the switch 11 switches between connecting and disconnecting the antenna connection terminal 110 to and from the first common terminal and switches between connecting and disconnecting the antenna connection terminal 120 to and from the filter 34. Note that the number of the switch elements included in the switch 11 is set appropriately in accordance with the number of the filters included in the radio frequency circuit 7.

Note that alternatively, the switch 11 may select one of connecting the terminal 11a to the terminal 11c and connecting the terminal 11a to the terminal 11d in a mutually exclusive manner and select one of connecting the terminal 11b to the terminal 11c and connecting the terminal 11b to the terminal 11d in a mutually exclusive manner. That is to say, according to this configuration, connecting the first common terminal to one of the antennas 2a and 2b and connecting the filter 34 to the other of the antennas 2a and 2b can be achieved simultaneously.

According to the foregoing configuration of the radio frequency circuit 7, the radio frequency circuit 7 can simultaneously perform the transmission and reception of signals of the band A (via the filters 21 and 22) and the transmission and reception of the band B (via the filters 23 and 34).

Here, for example, suppose a case where the band A (transmission signal Tx1, frequency f1) is Band B3 of 4G-LTE, and the band B (transmission signal Tx2, frequency f2) is Band B1 of 4G-LTE. In this case, when the simultaneous transmission of the transmission signal Tx1 of the band A and the transmission signal Tx2 of the band B is performed, two kinds of intermodulation distortions $IMD3_H$ (2×f2−f1) and $IMD3_L$ (2×f1−f2) are generated. Of these intermodulation distortions, the frequency of $IMD3_H$ is included in the downlink operation band of the band B (Band B1 of 4G-LTE), and the frequency of $IMD3_L$ is not included in the band B (Band B1 of 4G-LTE) or the band A (Band B3 of 4G-LTE). Because of this, an unwanted wave of $IMD3_H$ enters the reception path of the band B, and this causes degradation in the receiver sensitivity of the band B.

In response to this, in the radio frequency circuit 7 according to the present modified example, a transmission path of the band B (power amplifier 52+filter 34) and a reception path of the band B that includes the frequency of $IMD3_H$ (filter 23+low-noise amplifier 62) are connected to different antennas. Because of this, it becomes possible to secure a large isolation between the transmission path and the reception path of the band B and make the intensity of $IMD3_H$ that enters the reception path of the band B lower than the target value in the subsequent stage of the low-noise amplifier (for example, −110 dBm). Accordingly, it becomes possible to provide the radio frequency circuit 7 and the communication device 9, each of which enables 2-uplink transmission and in each of which degradation in receiver sensitivity is suppressed.

Note that the radio frequency circuits 1, 1A, 6, and 7 are exemplified as circuits that enable 2-uplink transmission. However, the radio frequency circuit according to the present disclosure is also applicable to a circuit that can simultaneously transmit three or more signals corresponding to three or more bands.

[2 Effects and the Like]

As described above, the radio frequency circuit 1 according to the present embodiment is capable of simultaneously transmitting a signal of the band A and the signal of the band B, the band A being made up of the first uplink operation band and the first downlink operation band, the band B being made up of the second uplink operation band and the second downlink operation band, the second downlink operation band overlapping (2×f2−f1), where f1 is a frequency of the first uplink operation band, and f2 is a frequency of the second uplink operation band, the radio frequency circuit 1 including the antenna connection terminals 110, 120, and 130 connected to antennas that differ from each other, the filter 21 that is connected to the antenna connection terminal 110 and has a pass band that includes the first uplink operation band, the filter 34 that is connected to the antenna connection terminal 120 and has a pass band that includes the second uplink operation band, the filter 43 that is connected to the antenna connection terminal 130 and has a pass band that includes the second downlink operation band, the power amplifier 51 connected to the filter 21, and the power amplifier 52 connected to the filter 34.

According to this, the transmission path of the band B (power amplifier 52+filter 34) and the reception path of the band B that includes the frequency of $IMD3_H$ (filter 43+low-noise amplifier 64) are connected to different antennas. Because of this, it becomes possible to secure a large isolation between the transmission path and the reception path of the band B and make the intensity of $IMD3_H$ that enters the reception path of the band B lower than the target value in the subsequent stage of the low-noise amplifier. Accordingly, it becomes possible to provide the radio frequency circuit 1 which enables the simultaneous transmission of a plurality of signals and in which degradation in receiver sensitivity is suppressed.

Further, for example, the radio frequency circuit 1 may further include the filter 22 that is connected to the antenna connection terminal 110 and has a pass band that includes the first downlink operation band, the filter 23 that is connected to the antenna connection terminal 110 and has a pass band that includes the second downlink operation band, and the filter 32 that is connected to the antenna connection terminal 120 and has a pass band that includes the first downlink operation band.

According to this, the transmission path of the band B (power amplifier 52+filter 34) and the reception path of the band B that includes the frequency of $IMD3_H$ (filter 23+low-noise amplifier 62) are connected to different antennas, and thus, it becomes possible to secure a large isolation between the transmission path and the reception path of the band B. Accordingly, the intensity of $IMD3_H$ that enters the reception path of the band B can be reduced below the target value in the subsequent stage of the low-noise amplifier.

Further, for example, in the radio frequency circuit 1A, the band C may be made up of the third uplink operation band and the third downlink operation band, the band D may be made up of the fourth uplink operation band and the fourth downlink operation band, the filter 21 may include the first uplink operation band and the third uplink operation band of the band A, the filter 45 may include the second downlink operation band and the third downlink operation band of the band B, and the filter 26 may include the second downlink operation band and the third downlink operation band. Moreover, the radio frequency circuit 1A may further include the filter 25 that is connected to the antenna connection terminal 110 and has a pass band that includes the fourth downlink operation band, the filter 35 that is connected to the antenna connection terminal 120 and has a pass band that includes the fourth uplink operation band, and the filter 44 that is connected to the antenna connection terminal 130 and has a pass band that includes the fourth downlink operation band.

According to this, the transmission path of the band B (filter 34) and the reception paths of the band B that includes the frequency of $IMD3_H$ (filter 26 and filter 45) are connected to different antennas. Because of this, it becomes possible to secure a large isolation between the transmission path and the reception paths of the band B and make the intensity of $IMD3_H$ that enters the reception path of the band B lower than the target value. Further, the transmission path of the band D (filter 35) and the reception paths of the band C that includes the frequency of $IMD3_H$ (filter 26 and filter 45) are connected to different antennas. Because of this, it becomes possible to secure a large isolation between the transmission path of the band D and the reception paths of the band C and make the intensity of $IMD3_H$ that enters the reception path of the band C lower than the target value. Accordingly, it becomes possible to provide the radio frequency circuit 1A which enables 2-uplink transmission and in which degradation in receiver sensitivity is suppressed.

Further, for example, in the radio frequency circuit 1A, the band C may be Band B66 for 4G-LTE or Band n66 for 5G-NR, and the band D may be Band B25 for 4G-LTE or Band n25 for 5G-NR.

Further, for example, in the radio frequency circuits 1, 1A, and 7, the band A may be Band B3 for 4G-LTE or Band n3 for 5G-NR, and the band B may be Band B1 for 4G-LTE or Band n1 for 5G-NR.

Further, for example, in the radio frequency circuit 6, the second downlink operation band of the band D may overlap (2×f2−f1), and the first downlink operation band of the band C may overlap (2×f1−f2), where f1 is a frequency of the first uplink operation band of the band C, and f2 is a center frequency of the second uplink operation band of the band D. Moreover, the radio frequency circuit 6 may further include the filter 23 that is connected to the antenna connection terminal 110 and has a pass band that includes the second downlink operation band, the filter 32 that is connected to the antenna connection terminal 120 and has a pass band that includes the first downlink operation band, and the filter 43 that is connected to the antenna connection terminal 130 and has a pass band that includes the second downlink operation band.

According to this, the transmission path of the band C (filter 21) and the reception paths of the band C that includes the frequency of IMD3$_L$ (filter 32 and filter 46) are connected to different antennas. Because of this, it becomes possible to secure a large isolation between the transmission path and the reception paths of the band C and make the intensities of unwanted waves of IMD3$_L$ that enter the reception paths of the band C lower than the target value of IMD3 in the subsequent stage of the low-noise amplifier. Further, the transmission path of the band D (filter 34) and the reception paths of the band D that includes the frequency of IMD3$_H$ (filter 23 and filter 43) are connected to different antennas. Because of this, it becomes possible to secure a large isolation between the transmission path and the reception paths of the band D and make the intensities of unwanted waves of IMD3$_H$ that enter the reception paths of the band D lower than the target value of IMD3 in the subsequent stage of the low-noise amplifier. Accordingly, it becomes possible to provide the radio frequency circuit 6 which enables 2-uplink transmission and in which degradation in receiver sensitivity is suppressed.

Further, for example, in the radio frequency circuits 1, 1A, 6, and 7, the band A, the band B, the band C, and the band D may belong to the low band group (700 MHz to 1 GHz).

Further, for example, in the radio frequency circuit 6, the band C may be Band B20 for 4G-LTE or Band n20 for 5G-NR, and the band D may be Band B8 for 4G-LTE or Band n8 for 5G-NR.

Further, for example, in the radio frequency circuit 1, the antenna connection terminals 110, 120, and 130, the filters 21, 34, and 43, and the power amplifiers 51 and 52 may be arranged on the same board.

According to this, the radio frequency circuit 1 can be downsized.

Further, the radio frequency circuit 7 according to the modified example 3 is capable of simultaneously transmitting a signal of the band A and a signal of the band B, the band A being made up of the first uplink operation band and the first downlink operation band, the band B being made up of the second uplink operation band and the second downlink operation band, the second downlink operation band overlapping (2×f2−f1), the first downlink operation band not overlapping (2×f1−f2), where f1 is a frequency of the first uplink operation band, and f2 is a frequency of the second uplink operation band, the radio frequency circuit 7 including the antenna connection terminals 110 and 120 connected to antennas that differ from each other, the filter 21 that is connected to the antenna connection terminal 110 and has a pass band that includes the first uplink operation band, the filter 34 that is connected to the antenna connection terminal 120 and has a pass band that includes the second uplink operation band, the filter 23 that is connected to the antenna connection terminal 110 and has a pass band that includes the second downlink operation band, the power amplifier 51 connected to the filter 21, and the power amplifier 52 connected to the filter 34, wherein the filter having a pass band that includes the second downlink operation band is not connected to the antenna connection terminal 120.

According to this, the transmission path of the band B (power amplifier 52+filter 34) and the reception path of the band B that includes the frequency of IMD3$_H$ (filter 23+low-noise amplifier 62) are connected to different antennas. Because of this, it becomes possible to secure a large isolation between the transmission path and the reception path of the band B and make the intensity of IMD3$_H$ that enters the reception path of the band B lower than the target value in the subsequent stage of the low-noise amplifier. Accordingly, it becomes possible to provide the radio frequency circuit 7 which enables the simultaneous transmission of a plurality of signals and in which degradation in receiver sensitivity is suppressed.

Further, the communication device 5 according to the present embodiment includes the RFIC 3 that performs processing on a radio frequency signal and the radio frequency circuit 1 that transmits the radio frequency signal between the RFIC 3 and the antennas 2a, 2b, and 2c.

According to this, it becomes possible to realize the effects of the radio frequency circuit 1 in the communication device 5.

Other Embodiments

The radio frequency circuits and the communication devices according to the present disclosure have been described using the embodiment and the modified examples. However, the radio frequency circuit and the communication device according to the present disclosure are not limited to the foregoing embodiment and modified examples. Other embodiments realized by combining optional constituent elements of the foregoing embodiment and modified examples, modified examples obtained by applying various modifications conceivable to those skilled in the art to the foregoing embodiment and modified examples without departing the scope of the present disclosure, and various devices incorporating the foregoing radio frequency circuits and communication devices may also be included in the present disclosure.

For example, in the circuit configurations of the radio frequency circuits and the communication devices according to the foregoing embodiment and the modified examples thereof, another circuit element, a wiring line, or the like may be inserted in a path connecting each circuit element and a signal path illustrated in the drawing.

Further, in the foregoing embodiment, the bands for 5G-NR or 4G-LTE are used. However, in addition to or in place of 5G-NR or 4G-LTE, communication bands for another wireless access technique may be used. For example, a communication band for a wireless local area network may alternatively be used. Alternatively, for example, a millimeter wave band of 7 GHz or higher may be used. In that case, the radio frequency circuit 1, the antennas 2a, 2b, and 2c, and the RFIC 3 may make up a millimeter wave antenna module, and as the filter, for example, a distributed-constant filter may be used.

The present disclosure can be widely used in communication devices such as mobile phones and the like as a radio frequency circuit to be installed in a front-end unit.

1, 1A, 6, 7, 500 Radio frequency circuit
2a, 2b, 2c Antenna
3 RF signal processing circuit (RFIC)
4 Base band signal processing circuit (BBIC)
5, 8, 9 Communication device
10, 11, 13 Switch
10a, 10b, 10c, 10d, 10e, 10f, 11a, 11b, 11c, 11d Terminal 21, 22, 23, 24, 25, 26, 31, 32, 33, 34, 35, 43, 44, 45, 46 Filter
51, 52, 53, 54 Power amplifier
61, 62, 63, 64, 65, 66, 67, 68 Low-noise amplifier
110, 120, 130 Antenna connection terminal

The invention claimed is:

1. A radio frequency circuit configured to simultaneously transmit a signal of a first band and a signal of a second band,
the first band comprising a first uplink operation band and a first downlink operation band, the second band comprising a second uplink operation band and a second downlink operation band,
the second downlink operation band overlapping ($2 \times f2 - f1$), where f1 is a frequency of the first uplink operation band, and f2 is a frequency of the second uplink operation band,
the radio frequency circuit comprising:
a first antenna terminal connected to a first antenna, a second antenna terminal connected to a second antenna, and a third antenna terminal connected to a third antenna, the first, second, and third antennas being different from each other;
a first filter connected to the first antenna terminal, the first filter having a pass band that comprises the first uplink operation band;
a second filter connected to the second antenna terminal, the second filter having a pass band that comprises the second uplink operation band;
a third filter connected to the third antenna terminal, the third filter having a pass band that comprises the second downlink operation band;
a first power amplifier connected to the first filter; and
a second power amplifier connected to the second filter,
wherein no filter connected to the second antenna terminal has a pass band that comprises the second downlink operation band.

2. The radio frequency circuit according to claim 1, further comprising:
a fourth filter connected to the first antenna terminal, the fourth filter having a pass band that comprises the first downlink operation band;
a fifth filter connected to the first antenna terminal, the fifth filter having a pass band that comprises the second downlink operation band; and
a sixth filter connected to the second antenna terminal, the sixth filter having a pass band that comprises the first downlink operation band.

3. The radio frequency circuit according to claim 2, further comprising:
a seventh filter connected to the first antenna terminal, the seventh filter having a pass band that comprises a fourth downlink operation band;
an eighth filter connected to the second antenna terminal, the eighth filter having a pass band that comprises a fourth uplink operation band; and
a ninth filter connected to the third antenna terminal, the ninth filter having a pass band that comprises the fourth downlink operation band, wherein a third band comprises a third uplink operation band and a third downlink operation band,
a fourth band comprises the fourth uplink operation band and the fourth downlink operation band,
the first filter has a pass band comprising the first uplink operation band and the third uplink operation band, the third filter has a pass band comprising the second downlink operation band and the third downlink operation band, and
the fifth filter has a pass band comprising the second downlink operation band and the third downlink operation band.

4. The radio frequency circuit according to claim 3,
wherein the third band is Band B66 for 4th Generation Long Term Evolution (4G-LTE) or Band n66 for 5th Generation New Radio (5G-NR), and
wherein the fourth band is Band B25 for 4th Generation Long Term Evolution (4G-LTE) or Band n25 for 5th Generation New Radio (5G-NR).

5. The radio frequency circuit according to claim 1,
wherein the first band is Band B3 for 4th Generation Long Term Evolution (4G-LTE) or Band n3 for 5th Generation New Radio (5G-NR), and
wherein the second band is Band B1 for 4G-LTE or Band n1 for 5G-NR.

6. The radio frequency circuit according to claim 1, further comprising:
a fifth filter connected to the first antenna terminal, the fifth filter having a pass band that comprises the second downlink operation band;
a sixth filter connected to the second antenna terminal, the sixth filter having a pass band that comprises the first downlink operation band; and
a tenth filter connected to the third antenna terminal, the tenth filter having a pass band that comprises the second downlink operation band, wherein
the second downlink operation band overlaps ($2 \times f2 - f1$), and the first downlink operation band overlaps ($2 \times f1 - f2$), where f1 is a frequency of the first uplink operation band, and f2 is a frequency of the second uplink operation band.

7. The radio frequency circuit according to claim 6, wherein the first band and the second band are in a low band group from 700 MHz to 1 GHz.

8. The radio frequency circuit according to claim 7,
wherein the first band is Band B20 for 4th Generation Long Term Evolution (4G-LTE) or Band n20 for 5th Generation New Radio (5G-NR), and
wherein the second band is Band B8 for 4G-LTE or Band n8 for 5G-NR.

9. The radio frequency circuit according to claim 1, wherein the first antenna terminal, the second antenna terminal, the third antenna terminal, the first filter, the second filter, the third filter, the first power amplifier, and the second power amplifier are arranged on a same board.

10. A communication device comprising:
a signal processing circuit configured to process a radio frequency signal; and
the radio frequency circuit according to claim 1 that transmits the radio frequency signal between the signal processing circuit and an antenna.

11. A radio frequency circuit configured to simultaneously transmit a signal of a first band and a signal of a second band,
the first band comprising a first uplink operation band and a first downlink operation band, the second band comprising a second uplink operation band and a second downlink operation band,
the second downlink operation band overlapping ($2 \times f2 - f1$), the first downlink operation band not overlapping ($2 \times f1 - f2$), where f1 is a frequency of the first uplink operation band, and f2 is a frequency of the second uplink operation band, the radio frequency circuit comprising:

a first antenna terminal connected to a first antenna and a second antenna terminal connected to a second antenna, the first and second antennas being different from each other;

a first filter connected to the first antenna terminal, the first filter having a pass band that comprises the first uplink operation band;

a second filter connected to the second antenna terminal, the second filter having a pass band that comprises the second uplink operation band;

a third filter connected to the first antenna terminal, the third filter having a pass band that comprises the second downlink operation band;

a first power amplifier connected to the first filter; and a second power amplifier connected to the second filter, wherein the third filter is not connected to the second antenna terminal, and the pass band of the second filter does not comprise the second downlink operation band, wherein no filter connected to the second antenna terminal has a pass band that comprises the second downlink operation band.

12. A communication device comprising:

a signal processing circuit configured to process a radio frequency signal; and the radio frequency circuit according to claim 11 that transmits the radio frequency signal between the signal processing circuit and an antenna.

\* \* \* \* \*